(12) United States Patent
Chang

(10) Patent No.: US 8,132,797 B2
(45) Date of Patent: Mar. 13, 2012

(54) FLOATING-TYPE CLAMPING DEVICE

(76) Inventor: Pin-Feng Chang, Fengyuan (TW)

( * ) Notice: Subject to any disclaimer, the term of this patent is extended or adjusted under 35 U.S.C. 154(b) by 431 days.

(21) Appl. No.: 12/474,949

(22) Filed: May 29, 2009

(65) Prior Publication Data

US 2010/0301535 A1    Dec. 2, 2010

(51) Int. Cl.
*B21F 41/00*    (2006.01)
(52) U.S. Cl. ............................. 269/25; 29/278
(58) Field of Classification Search ............ 29/255, 29/270, 278, 281.1; 269/25
See application file for complete search history.

(56) References Cited

U.S. PATENT DOCUMENTS 2,614,488 A * 10/1952 Purcell ..................... 100/269.13
(Continued)

*Primary Examiner* — Monica Carter
*Assistant Examiner* — Melanie Alexander
(74) *Attorney, Agent, or Firm* — Fitzpatrick, Cella, Harper & Scinto

(57) ABSTRACT

A floating-type clamping device includes a pneumatic cylinder unit, a pressing plate, a floating plate, two grips, an air supply pipe unit, and a safety control unit. The pneumatic cylinder unit includes at least one cylinder. The floating plate includes a plate body, a plurality of nozzles, and an air passage disposed inside the plate body and communicated with the nozzles. The plate body cooperates with the pressing plate to clamp a plate material when the pressing plate moves downward. The air supply pipe unit is connected and supplies compressed air to the pneumatic cylinder unit and the floating plate. The safety control unit is connected to the air supply pipe unit and is operable to block or permit the flow of the compressed air into at least one of the cylinder and the air passage.

5 Claims, 5 Drawing Sheets

U.S. PATENT DOCUMENTS

| | | | |
|---|---|---|---|
| 2,651,061 A * | 9/1953 | Polleys | 12/1 F |
| 2,686,552 A * | 8/1954 | Faeber et al. | 100/343 |
| 2,934,129 A * | 4/1960 | Wilson et al. | 100/319 |
| 3,454,741 A * | 7/1969 | Stewart | 219/243 |
| 4,762,199 A * | 8/1988 | Holmes | 182/2.9 |
| 5,067,277 A * | 11/1991 | Magalotti | 49/386 |
| 5,615,984 A * | 4/1997 | Oberbreckling | 182/46 |
| 6,877,199 B2 * | 4/2005 | Cassese et al. | 239/124 |

* cited by examiner

FLOATING-TYPE CLAMPING DEVICE

BACKGROUND OF THE INVENTION

1. Field of the Invention

The invention relates to a floating-type clamping device, more particularly to a floating-type clamping device having a safety control unit.

2. Description of the Related Art

Referring to FIG. 1, a conventional floating-type clamping device 1 is used for clamping a plate material (A) to be moved and processed on a worktable (B).

The floating-type clamping device 1 includes a frame body 11, a pipe inlet control valve 12, a pneumatic cylinder unit 13, a floating plate 14, and two grips 15. The floating plate 14 is connected to the frame body 11 and is adapted for disposing the plate material (A) thereon. The grips 15 are connected to the frame body 11 and are adapted to be gripped by an operator. The pneumatic cylinder unit 13 includes two cylinders 131 and a pressing plate 132 connected to the cylinders 131. The pressing plate 132 is operated by the cylinders 131 to move upward and downward. The floating plate 14 cooperates with the pressing plate 132 to clamp the plate material (A) when the pressing plate 132 moves downward.

When the pipe inlet control valve 12 is opened, compressed air is supplied to the cylinders 131 so as to move the pressing plate 132 downward to clamp the plate material (A) between the pressing plate 132 and the floating plate 14. At the same time, the compressed air is supplied to the floating plate 14 and is sprayed from a bottom surface of the floating plate 14 so as to form an air gap between the floating plate 14 and the worktable (B). Therefore, the friction between the floating plate 14 and the worktable (B) can be reduced so as to facilitate the movement of the floating-type clamping device 1 on the worktable (B).

However, if the pipe inlet control valve 12 is opened inadvertently when the plate material (A) is disposed on the floating plate 14 by an operator, the hand of the operator may be injured by the pressing plate 132.

Furthermore, if the operator inadvertently releases the grips 15, the floating-type clamping device 1 may lose balance and move about in an uncontrolled manner, which may cause injury to the operator.

Accordingly, there is a need for a floating-type clamping device with improved safety during operation.

SUMMARY OF THE INVENTION

Therefore, an object of the present invention is to provide a floating-type clamping device having a safety control unit so as to improve the safety during operation.

Accordingly, the floating-type clamping device for clamping a plate material of this invention includes a frame body, a pneumatic cylinder unit, a pressing plate, a floating plate, two grips, an air supply pipe unit, and a safety control unit. The pneumatic cylinder unit includes at least one cylinder supported by the frame body. The pressing plate is connected to and is operated by the cylinder so as to move upward or downward. The floating plate is connected to the frame body below the pressing plate, and includes a plate body, a plurality of nozzles provided in a bottom face of the plate body, and an air passage disposed inside the plate body and communicated with the nozzles. The plate body cooperates with the pressing plate to clamp the plate material when the pressing plate moves downward. The grips are connected to the frame body and are adapted to be gripped by an operator. The air supply pipe unit is connected and supplies compressed air to the pneumatic cylinder unit and the floating plate. The safety control unit is connected to the air supply pipe unit and is operable to block or permit the flow of the compressed air into at least one of the cylinder and the air passage. The safety control unit is disposed on the frame body near or on at least one of the grips so that the safety control unit can be operated by at least one hand of the operator which holds at least one of the grips simultaneous with a gripping action of the operator.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
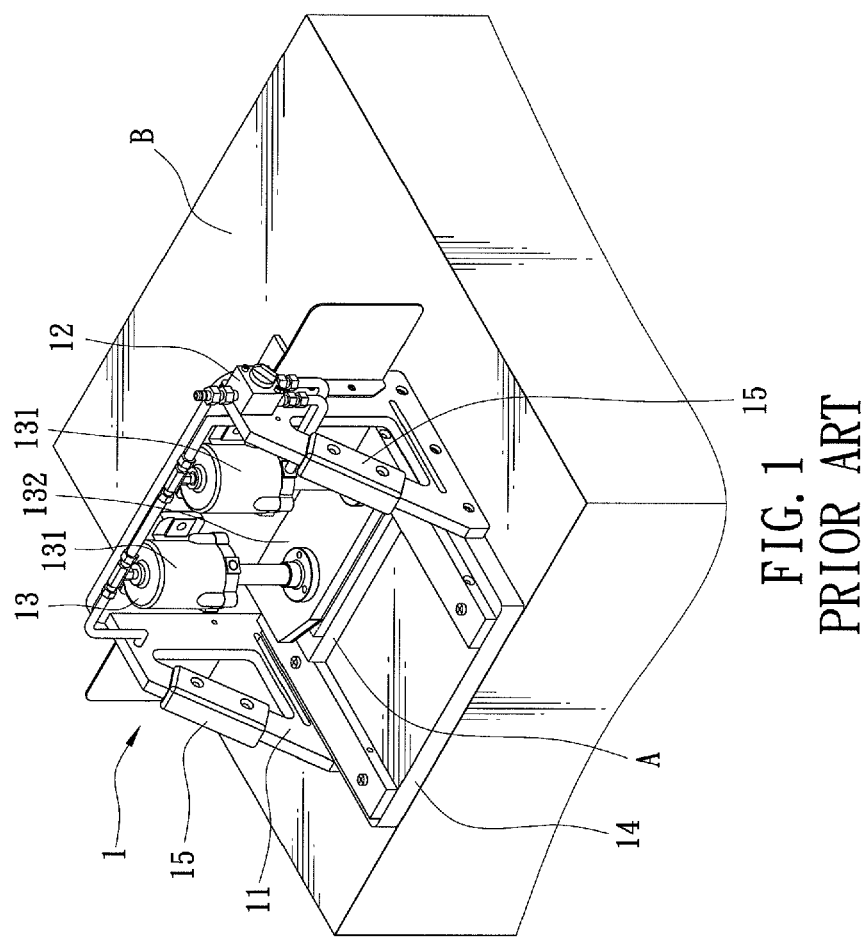
FIG. 1 is a perspective view of a conventional floating-type clamping device for clamping a plate material.
Figure 2:
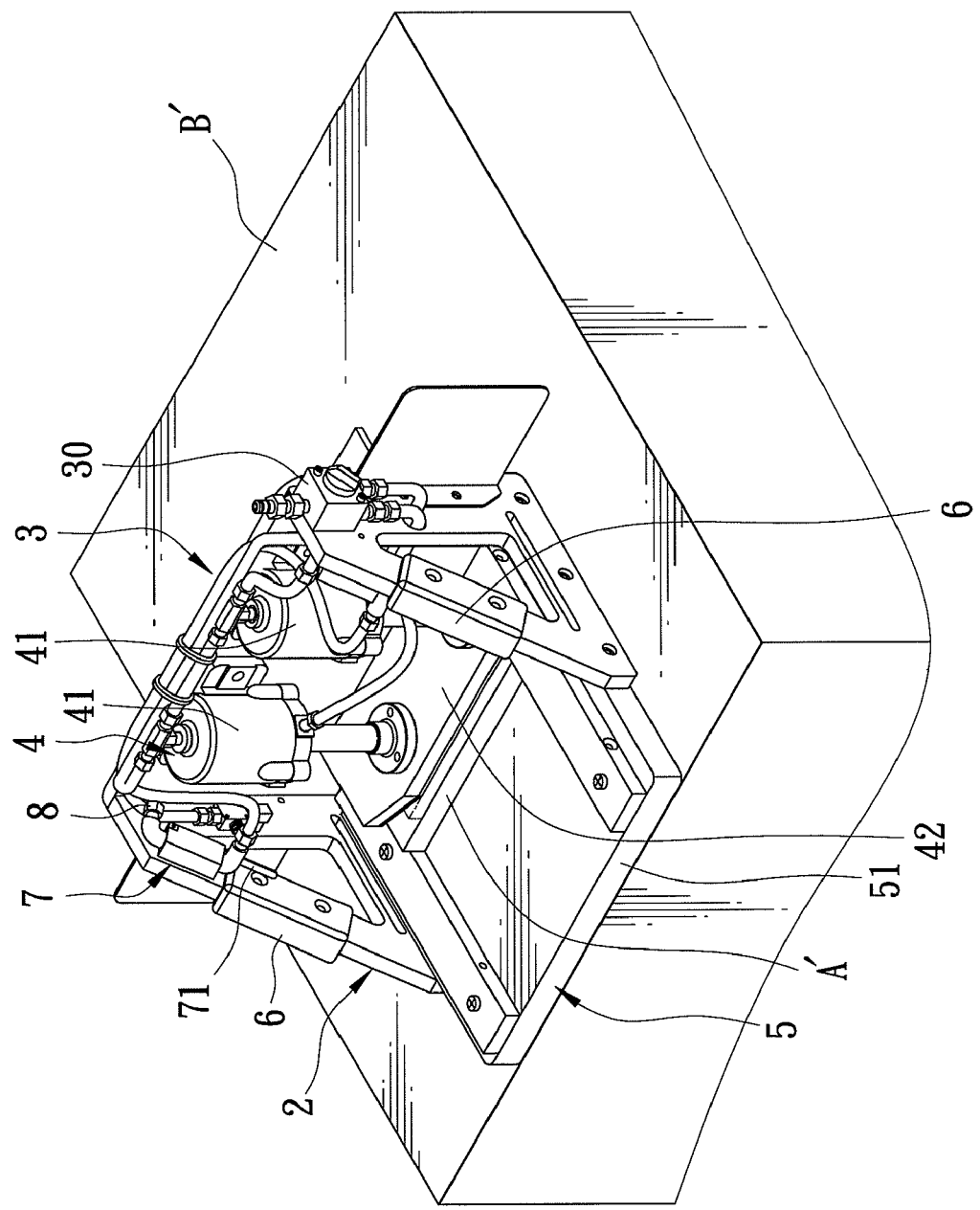
FIG. 2 is a perspective view of a preferred embodiment of a floating-type clamping device for clamping a plate material according to this invention.

Referring to FIGS. 2, 3, 4, and 5, the preferred embodiment of a floating-type clamping device according to this invention is used for clamping a plate material (A') to be floated and moved on a worktable (B'), and includes a frame body 2, a pneumatic cylinder unit 4, a pressing plate 42, a floating plate 5, two grips 6, an air supply pipe unit 3, a safety control unit 7, a flow control valve 8, and a pipe inlet control valve 30.

The pneumatic cylinder unit 4 includes two cylinders 41 supported by the frame body 2, and a cylinder inlet valve 43 connected to the cylinders 41 for introducing air into the cylinders 41.

The pressing plate 42 is connected to and is operated by the cylinders 41 so as to move upward or downward.

The floating plate 5 is disposed above the worktable (B') and is connected to the frame body 2 below the pressing plate 42. The floating plate 4 includes a plate body 51, a plurality of nozzles 53 provided in a bottom face of the plate body 51, an air passage 52 disposed inside the plate body 51 and communicated with the nozzles 53, and a plate inlet valve 54 connected to the air passage 52 for introducing air into the air passage 52. The plate body 51 cooperates with the pressing plate 42 to clamp the plate material (A') when the pressing plate 42 moves downward.

The grips 6 are connected to the frame body 2 and are adapted to be gripped by an operator so as to operate and move the floating-type clamping device on the worktable (B').

The safety control unit 7 is connected to the air supply pipe unit 3 and is operable to block or permit the flow of the compressed air into the cylinders 41 and the air passage 52. The safety control unit 7 is disposed on the grips 6 on the frame body 2 so that the safety control unit 7 can be operated by two hands of the operator which hold the grips simultaneous with a gripping action of the operator. Alternatively, the safety control unit 7 can be disposed on the frame body 2 near the grips 6. The safety control unit 7 includes two safety valves 70, two press buttons 72 respectively connected to the safety valves 70, and two levers 71 manually operable to respectively press the press buttons 72 so as to open the safety valves 70. The safety valves 70 are connected in series and are disposed near the grips 6, respectively.

The flow control valve 8 is connected to the air supply pipe unit 3 and is disposed between the safety control unit 7 and the air passage 52 so as to regulate a flow rate of the compressed air into the air passage 52.

The pipe inlet control valve 30 is disposed on the frame body 2 and is connected to the air supply pipe unit 3 for introducing air into the air supply pipe unit 3.

The safety valves 70 are disposed downstream of the pipe inlet control valve 30 and upstream of the cylinder inlet valve 43 and the plate inlet valve 54 to control the flow of the compressed air to the plate inlet valve 54 and the cylinder inlet valve 43.

The air supply pipe unit 3 is connected and supplies compressed air to the pneumatic cylinder unit 4 and the floating plate 5. The air supply pipe unit 3 includes a first flow passage 31 connected to the cylinder inlet valve 43, a second flow passage 32 connected to the plate inlet valve 54, a third flow passage 33 connected to the safety valves 70, a fourth flow passage 34 connected to the safety valves 70 and the plate inlet valve 54, and a fifth flow passage 35 connected to the safety valves 70 and the cylinder inlet valve 43.

Figure 3:
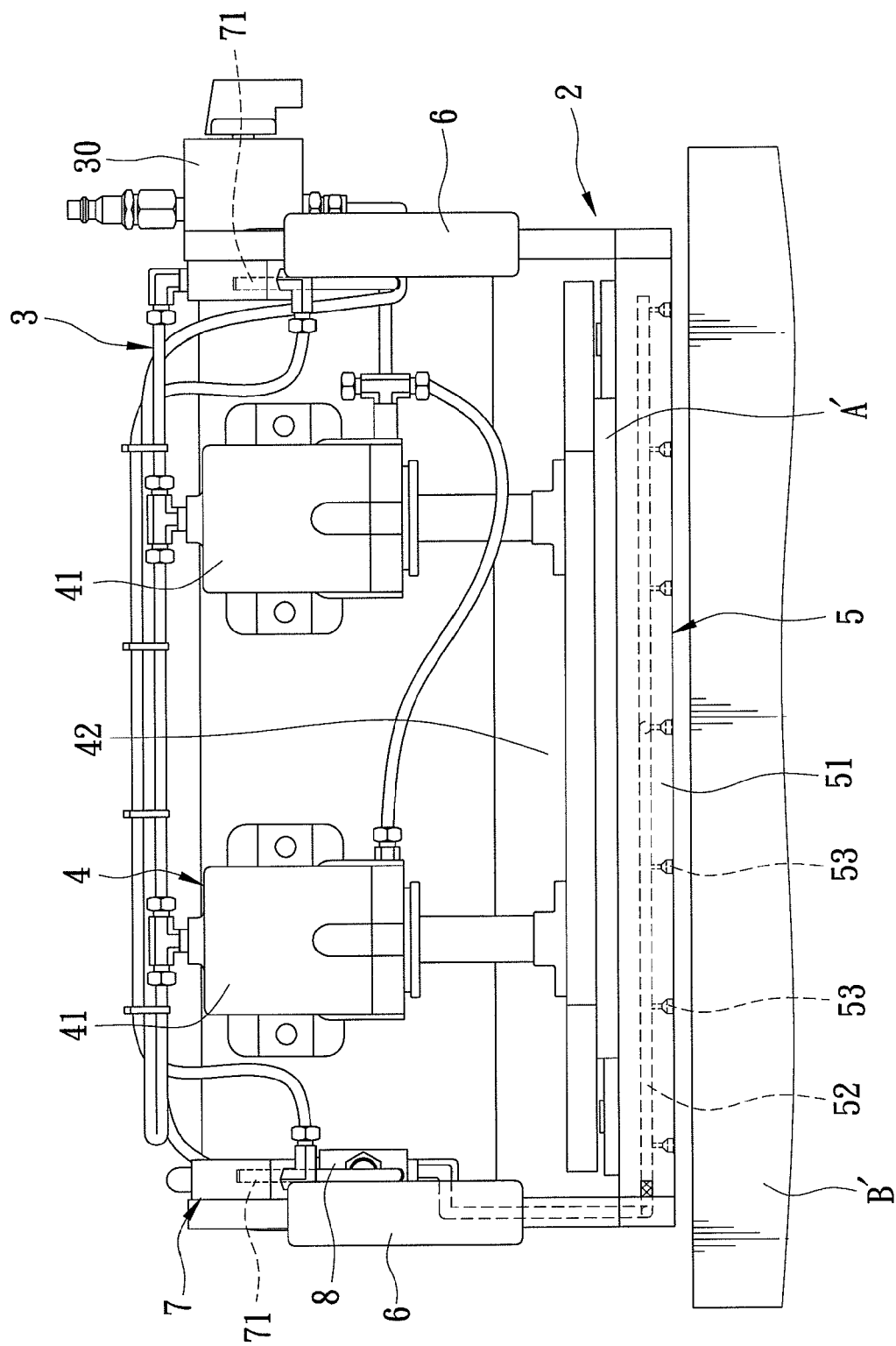
FIG. 3 is a front view of the preferred embodiment.
Figure 4:
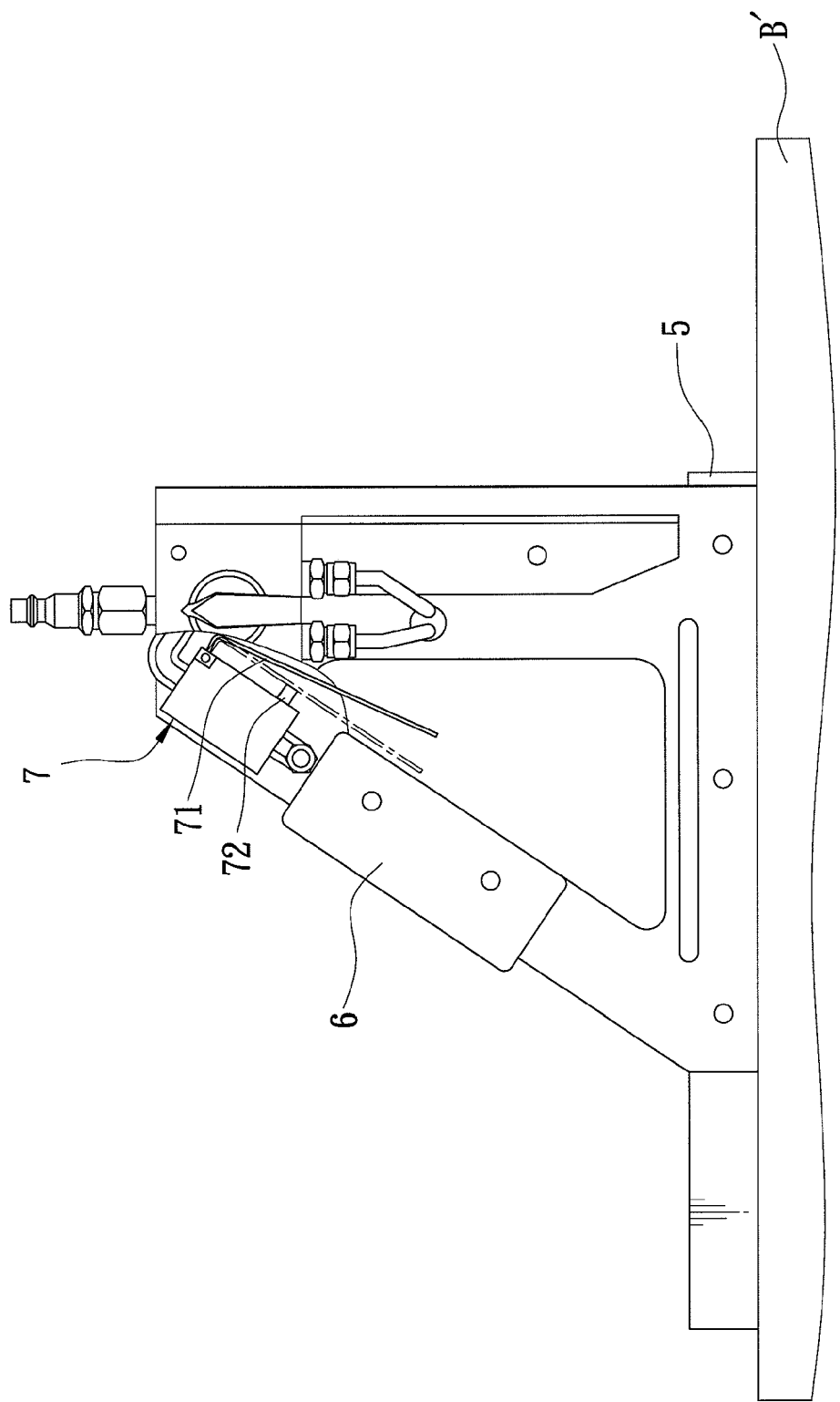
FIG. 4 is a side view of the preferred embodiment.
Figure 5:
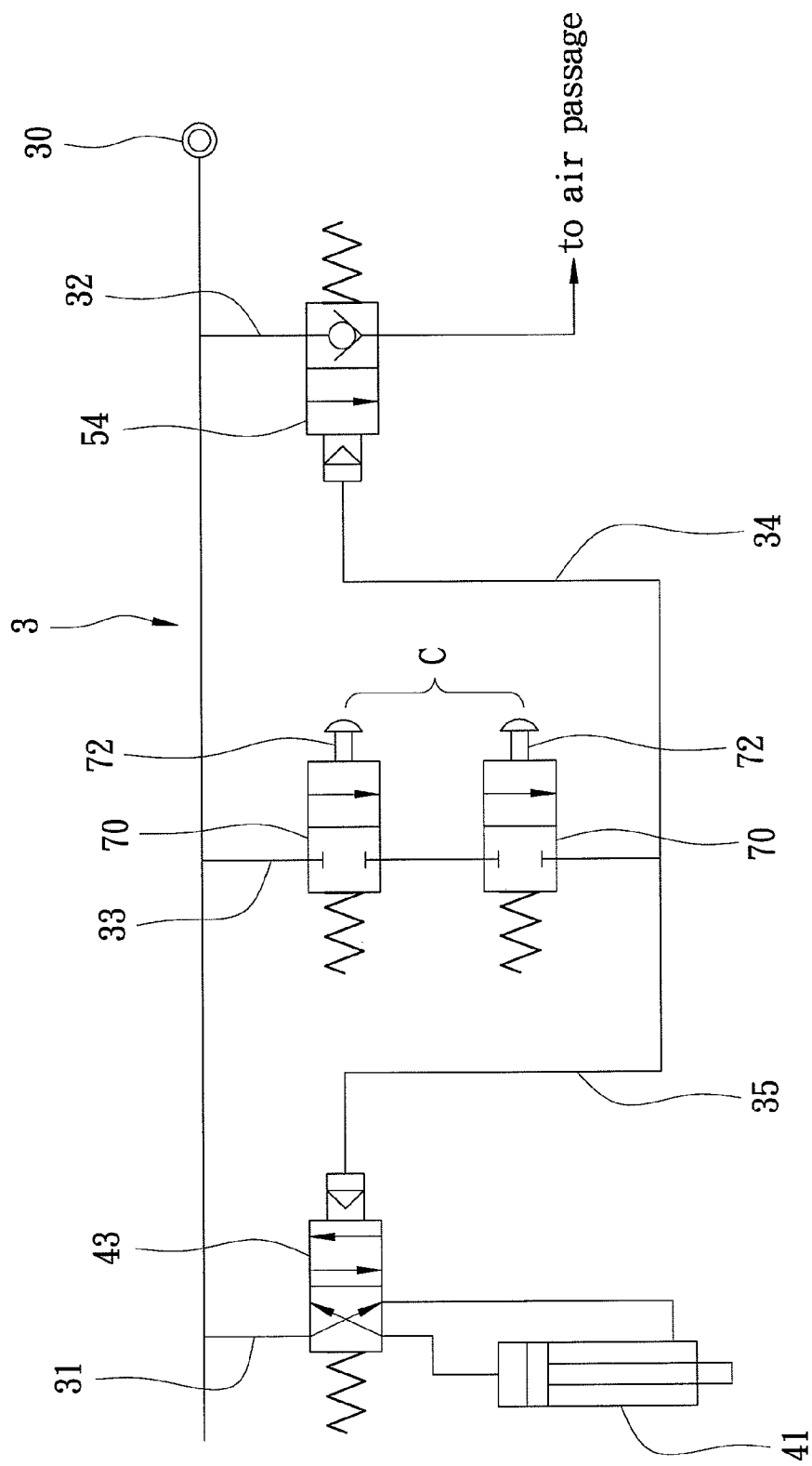
FIG. 5 is a schematic diagram illustrating a control manner of a safety control unit used in the preferred embodiment.

Specifically referring to FIGS. 3 and 5, when the pipe inlet control valve 30 is opened, the compressed air is supplied into the air supply pipe unit 3. The flow of the compressed air into the cylinders 41 and the air passage 52 is blocked by the safety control unit 7 before the press buttons 72 are pressed.

When the press buttons 72 are pressed by the levers 71 operated by the hands of the operator, the safety valves 70 are opened, and the compressed air flows to the plate inlet valve 54 and the cylinder inlet valve 43 through the respective fourth and fifth flow passages 34, 35, thereby actuating the plate inlet valve 54 and the cylinder inlet valve 43 to open and permitting the compressed air to flow into the air passage 52 and the cylinders 41 through the respective second and first flow passages 32, 31. Therefore, the pressing plate 42 moves downward to clamp the plate material (A') between the pressing plate 42 and the floating plate 5. At the same time, the compressed air is supplied to the floating plate 5 and is sprayed from the nozzles 53 of the floating plate 5 so as to form an air gap between the floating plate 5 and the worktable (B'). Therefore, the friction between the floating plate 5 and the worktable (B') can be reduced so as to facilitate the movement of the floating-type clamping device on the worktable (B').

Since the safety valves 70 are connected in series, the press buttons 72 should be pressed by two hands of the operator holding two grips 6 simultaneous with a gripping action of the operator so as to open the safety valves 70. Therefore, the problem of injuring the hands of the operator can be avoided.

When the hands of the operator are removed from the levers 71, the flow of the compressed air into the cylinders 41 and the air passage 52 is blocked by the safety control unit 7. At the same time, the air gap between the floating plate 5 and the worktable (B') disappears and the friction between the floating plate 5 and the worktable (B') is increased. Therefore, the problem of losing balance and moving about in an uncontrolled manner encountered in the conventional floating-type clamping device 1 can be avoided.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A floating-type clamping device for clamping a plate material, comprising:
    a frame body;
    a pneumatic cylinder unit including at least one cylinder supported by said frame body;
    a pressing plate connected to and operated by said cylinder so as to move upward or downward;
    a floating plate connected to said frame body below said pressing plate, and including a plate body, a plurality of nozzles provided in a bottom face of said plate body, and an air passage disposed inside said plate body and communicated with said nozzles, said plate body cooperating with said pressing plate to clamp the plate material when said pressing plate moves downward;
    two grips connected to said frame body and adapted to be gripped by an operator;
    an air supply pipe unit connected and supplying compressed air to said pneumatic cylinder unit and said floating plate;
    a safety control unit connected to said air supply pipe unit and operable to block or permit the flow of said compressed air into at least one of said cylinder and said air passage, said safety control unit being disposed on said frame body near or on at least one of said grips so that said safety control unit can be operated by at least one hand of the operator which holds at least one of said grips simultaneous with a gripping action of the operator; and
    a flow control valve connected to said air supply pipe unit and disposed between said safety control unit and said air passage so as to regulate a flow rate of the compressed air into said air passage.

2. The floating-type clamping device as claimed in claim 1, wherein said safety control unit is disposed on at least one of said grips.

3. The floating-type clamping device as claimed in claim 1, wherein said safety control unit is disposed near at least one of said grips.

4. A floating-type clamping device for clamping a plate material, comprising:
    a frame body;
    a pneumatic cylinder unit including at least one cylinder supported by said frame body, and a cylinder inlet valve connected to said cylinder for introducing air into said cylinder;
    a pressing plate connected to and operated by said cylinder so as to move upward or downward;
    a floating plate connected to said frame body below said pressing plate, and including a plate body, a plurality of nozzles provided in a bottom face of said plate body, an air passage disposed inside said plate body and communicated with said nozzles, and a plate inlet valve connected to said air passage for introducing air into said air passage, said plate body cooperating with said pressing plate to clamp the plate material when said pressing plate moves downward;
    two grips connected to said frame body and adapted to be gripped by an operator;
    an air supply pipe unit connected and supplying compressed air to said pneumatic cylinder unit and said floating plate;
    a safety control unit connected to said air supply pipe unit and operable to block or permit the flow of said compressed air into at least one of said cylinder and said air passage, said safety control unit being disposed on said frame body near or on at least one of said grips so that said safety control unit can be operated by at least one hand of the operator which holds at least one of said grips simultaneous with a gripping action of the operator, said safety control unit including at least one safety valve, a press button connected to said safety valve, and a lever manually operable to press said press button so as to open or close said safety valve; and a pipe inlet control valve connected to said air supply pipe unit for introducing air into said air supply pipe unit, said safety valve being disposed downstream of said pipe inlet control valve and upstream of said cylinder inlet valve and said plate inlet valve to control the flow of said compressed air to said plate inlet valve and said cylinder inlet valve, wherein said air supply pipe unit includes a first flow passage connected to said cylinder inlet valve, a second flow passage connected to said plate inlet valve, a third flow passage connected to said safety valve, a fourth flow passage connected to said safety valve and said plate inlet valve, and a fifth flow passage connected to said safety valve and said cylinder inlet valve.

5. The floating-type clamping device of claim 4, wherein said safety control unit includes two said safety valves which are connected in series and which are disposed near said grips, respectively.

* * * * *